United States Patent [19]
Slicker et al.

[11] Patent Number: 5,314,050
[45] Date of Patent: May 24, 1994

[54] CLUTCH MODE CONTROL LOGIC

[75] Inventors: James Slicker, West Bloomfield; Joseph S. Mazur, Livonia; Michael T. Breen, Garden City, all of Mich.

[73] Assignee: Eaton Corporation, Cleveland, Ohio

[21] Appl. No.: 987,772

[22] Filed: Dec. 9, 1992

[51] Int. Cl.⁵ ............................................. F16D 43/22
[52] U.S. Cl. ..................................... 477/171; 477/175
[58] Field of Search ............... 192/0.055, 0.033, 0.075, 192/0.076, 0.094, 0.096

[56] References Cited

U.S. PATENT DOCUMENTS

| | | | |
|---|---|---|---|
| 4,591,038 | 5/1986 | Asagi et al. | 192/.076 X |
| 4,618,043 | 10/1986 | Hattori et al. | 192/.075 X |
| 4,646,891 | 3/1987 | Braun | 192/.076 X |
| 4,732,248 | 3/1988 | Yoshimura et al. | 192/.055 |
| 4,766,544 | 8/1988 | Kurihara et al. | 364/424.1 |
| 4,766,967 | 8/1988 | Slicker et al. | 180/54.1 |
| 4,799,160 | 1/1989 | Arbeille et al. | 192/.055 X |
| 4,854,433 | 8/1989 | Tellert | 192/.076 X |
| 4,858,131 | 8/1989 | Sugimura et al. | 192/.096 X |
| 5,060,158 | 10/1991 | Kono et al. | 192/.076 X |

Primary Examiner—Leslie A. Braun
Assistant Examiner—Andrea Pitts
Attorney, Agent, or Firm—Krass & Young

[57] ABSTRACT

A friction clutch coupling an engine and a gear transmission of a vehicle is controlled by a microprocessor based circuit using logic which defines operating modes according to engine and clutch conditions. During the time of clutch closure, when the vehicle is starting from rest in a startup or launch mode, the throttle or other engine control signal is restrained from quickly responding to the accelerator pedal. This avoids engine overspeeding which results from generating high torque before sufficient clutch capacity has been achieved. The control signal is developed as a function of the pedal position under control of throttle logic which, in turn, is dependent on clutch operating modes defined by the clutch logic. The clutch operating modes are four modes for automatic clutch operation comprising touch point approach mode which prohibits a throttle signal during initial clutch movement, creep mode or startup mode after touch point occurs, and lockup mode for completing clutch closing when low clutch slip is attained. A non-automatic mode is entered before the accelerator pedal is depressed or when engine stall conditions are detected.

10 Claims, 4 Drawing Sheets

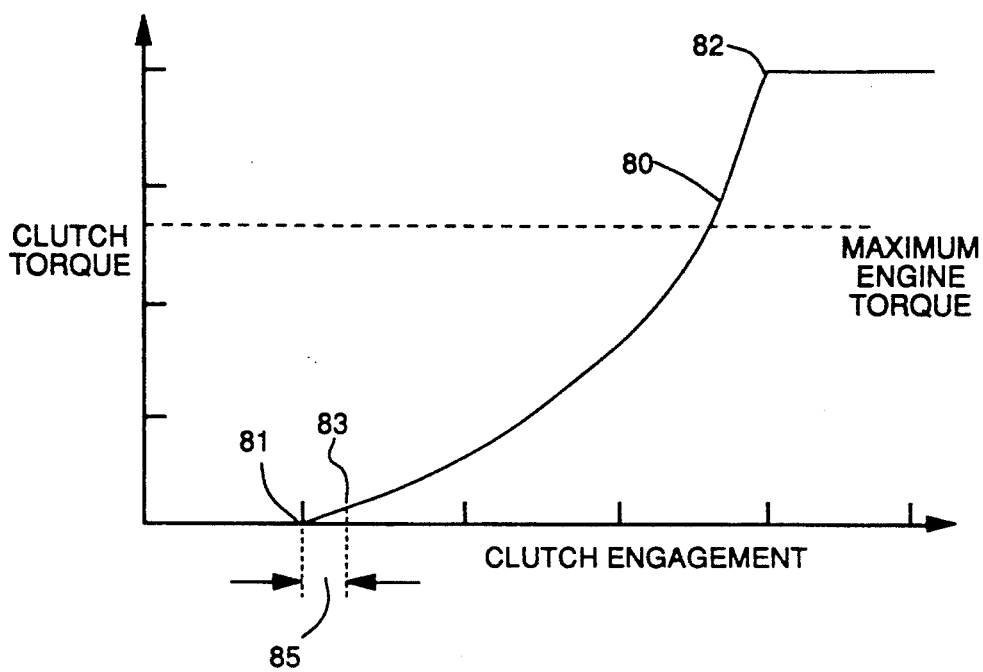
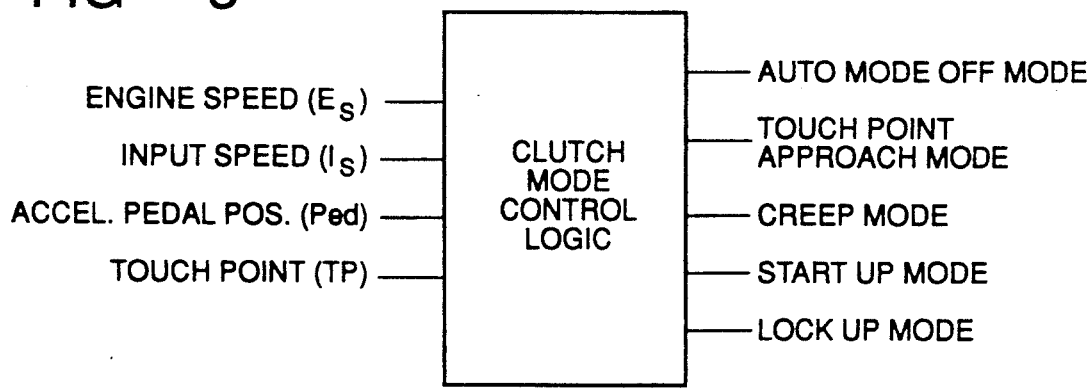
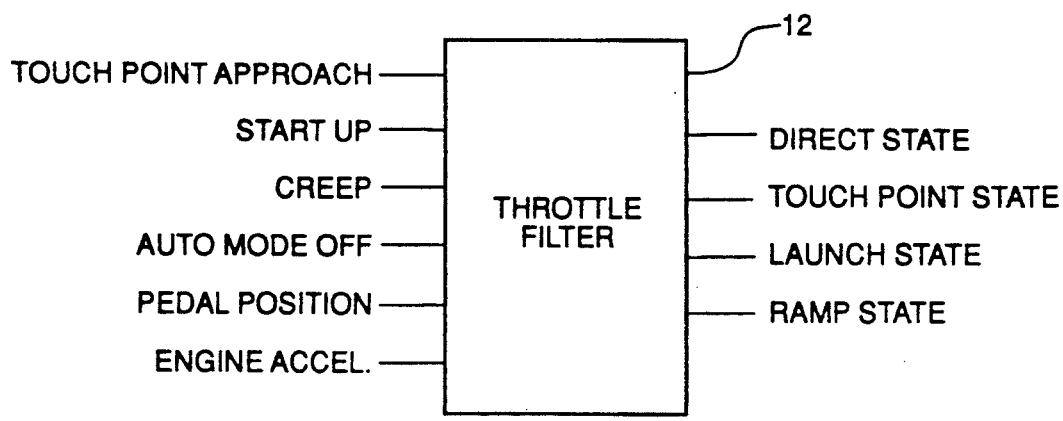

CLUTCH MODE CONTROL LOGIC

FIELD OF THE INVENTION

This invention relates to an engine and automatic clutch control method, and more particularly to the logic for controlling an automatic clutch as well as engine throttle demand.

BACKGROUND OF THE INVENTION

In recent years there has been a growing interest in increased automation in the control of the drive train of motor vehicles, and most especially in control of the drive train of large trucks. The use of automatic transmissions in passenger automobiles and light trucks is well known. The typical automatic transmission in such a vehicle employs a fluid torque converter and hydraulically actuated gears for selecting the final drive ratio between the engine shaft and the drive wheels. This gear selection is based upon engine speed, vehicle speed and the like. It is well known that such automatic transmissions reduce the effectiveness of the transmission of power from the engine to the drive shaft, with the consummate reduction in fuel economy and power as compared with the skilled operation of a manual transmission. Such hydraulic automatic transmissions have not achieved wide spread use in large motor trucks because of the reduction in efficiency of the operation of the vehicle and added cost.

One of the reasons for the loss of efficiency when employing a hydraulic automatic transmission is loss occurring in the fluid torque converter. A typical fluid torque converter exhibits slippage and consequent loss of torque and power in all modes. It is known in the art to provide lockup torque converters that provide a direct link between the input shaft and the output shaft of the transmission above certain engine speeds. This technique provides adequate torque transfer efficiency when engaged, however, this technique provides no gain in efficiency at lower speeds.

It has been proposed to eliminate the inefficiencies inherent in a hydraulic torque converter by substitution of an automatically actuated friction clutch. This substitution introduces certain problems not exhibited in the use of the hydraulic torque converters. U.S. patent application Ser. No. 772,204, filed Oct. 7, 1991 and entitled "Closed Loop Launch and Creep Control for Automatic Clutch" teaches the minimization or elimination of torsional oscillations due to compliance in the driveline during clutch engagement by controlling the clutch actuation to effect a smooth engagement. U.S. patent application Ser. No. 772,778, filed Oct. 7, 1991 and entitled "Closed Loop Launch and Creep Control for Automatic Clutch with Robust Algorithm" addresses the same problem and includes a prefilter to shape the system transient response and reduces the need for detailed particularization for individual vehicles or vehicle models. Each of those disclosures, Ser. No. 772,204 and Ser. No. 772,778, hereby incorporated by reference, is assigned to the assignee of this invention and includes the generation of a clutch control signal which is dependent on the selection of a creep or launch mode.

Still another problem relates to the slow response to the clutch actuation algorithm. Friction clutches exhibit considerable time delay between the point when throttle actuation calls for clutch application and the point that the clutch develops torque capacity equivalent to the engine torque, so that in the meantime the engine is not restrained and its speed may become excessive. Here a method is proposed which approximates the action of a human operator, taking into account the condition of clutch actuation to coordinate the engine speed with the clutch engagement.

SUMMARY OF THE INVENTION

It is therefore an object of the invention to provide a control method for establishing a clutch mode for control of clutch actuation and useful for control of the throttle or other engine torque demand input during clutch engagement.

This invention provides automatic and reliable control of acceleration pedal input to the vehicle engine during initial application of a clutch controlled by an automatic clutch actuation controller. This invention is employed in a combination including an engine, a friction clutch, a multi-speed transmission having a neutral position, at least one inertially-loaded traction wheel connected to the output of the multi-speed transmission, and an automatic clutch controller.

The clutch controller is provided with inputs comprising accelerator pedal position, engine speed, transmission input speed, vehicle brake application, and a gear indication and engage/disengage signal from a shift controller, and yields outputs for controlling clutch engagement and for limiting engine torque. The clutch controller determines whether the vehicle is starting out in launch mode, wherein the pedal position is at least 25% of full travel, or creep mode wherein the pedal position is below 25%. It also determines when, during the engagement of the clutch plates, a touch point occurs and later during clutch closure, it determines when the clutch capacity is sufficient to cause engine deceleration. The controller has four automatic modes and a non-automatic mode. The latter is Auto Mode Off and commands the clutch to be fully disengaged. The automatic modes include Touch Point Approach Mode which commands the clutch to go to the touch point, Creep Mode which maintains the clutch in a slipping condition at low accelerator pedal positions, Startup Mode which commands a controlled clutch closure as a function of accelerator pedal position, and Lockup Mode which commands full clutch engagement.

Using this mode information, throttle filter logic within the clutch controller determines one of four filter states: Launch, Touch Point Approach, Ramp and Direct. In Direct state the output is equal to the pedal position signal. In Touch Point Approach state, the output signal is zero. In Launch state, the output is a given fraction, say 40% to 60%, of pedal position signal and is subject to a minimum value and a prescribed transfer to the given fraction. In Ramp state, the output gradually increases to the pedal position signal.

Upon vehicle starting with the vehicle stationary or nearly so and the accelerator pedal depressed, the Touch Point Approach state prevails until the clutch closes to the touch point. Then, if the pedal position is below 25% of its full travel, the control will be in creep mode and the filter will be in the Direct state. However, if the pedal is above 25%, the filter will be in Launch state and will ramp the output signal to the set fraction of the pedal position signal and then hold at that fraction until engine deceleration is sensed, indicating that the clutch capacity has reached a substantial value.

That triggers the Ramp state and causes the output signal to gradually increase to the pedal position signal. The starting sequence is then complete. This process allows an orderly application of throttle or other torque control signal to the engine which is appropriate for the pedal and clutch conditions and which does not allow the engine to overspeed due to insufficient clutch capacity. In no event is the throttle filter output greater than the pedal position signal.

BRIEF DESCRIPTION OF THE DRAWINGS

The above and other advantages of the invention will become more apparent from the following description taken in conjunction with the accompanying drawings wherein like references refer to like parts and wherein:

FIG. 2 is a curve of clutch torque as a function of clutch position;

FIG. 3 is a diagram of a clutch control logic block showing the inputs and the outputs;

FIG. 5 is a diagram of a throttle filter logic block showing the inputs and the outputs;

DESCRIPTION OF THE INVENTION

Figure 1:
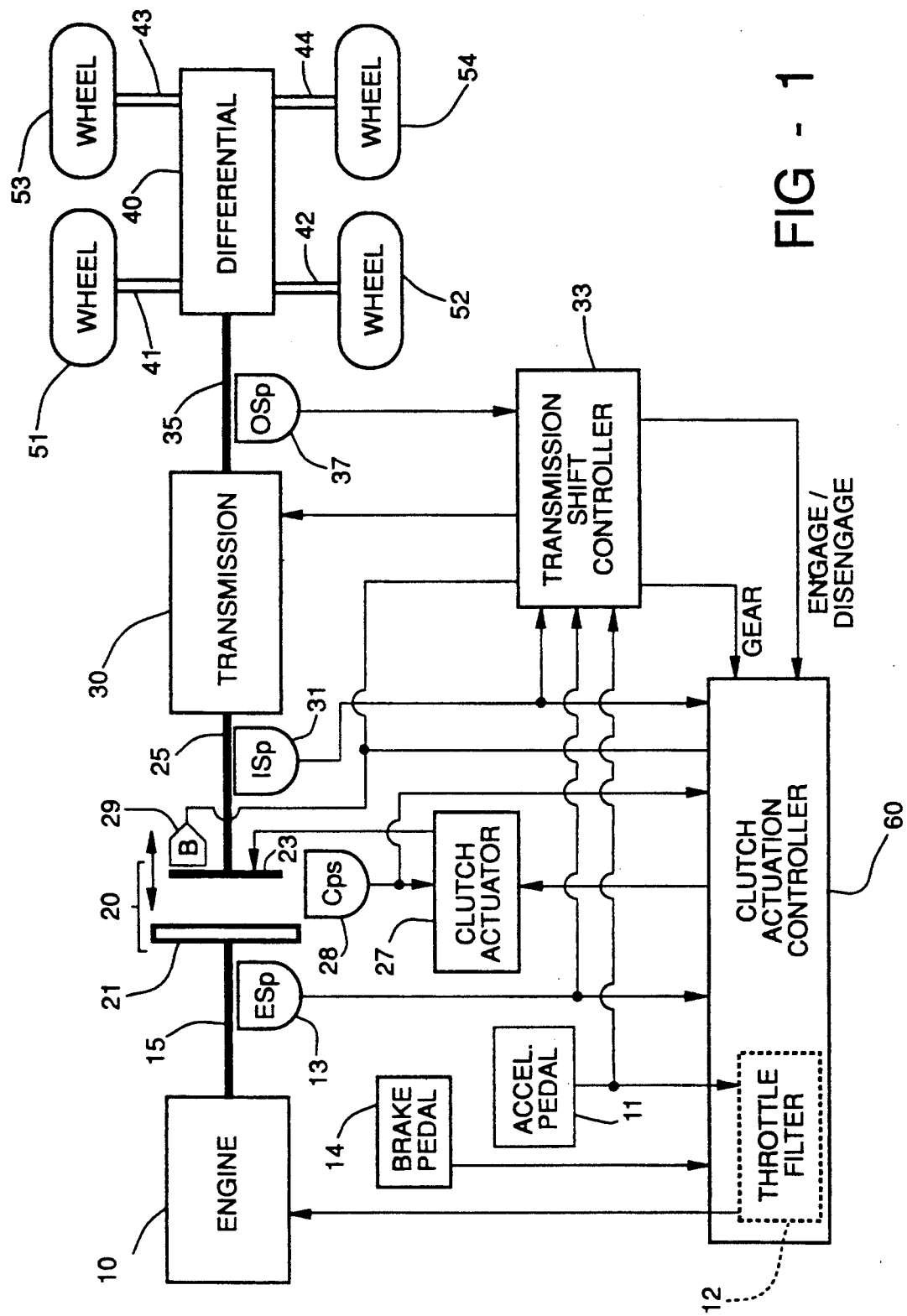
FIG. 1 is a schematic diagram of a transmission driven through a clutch by an engine and an engine and clutch controller for carrying out the invention.

FIG. 1 illustrates in schematic form the drive train of a motor vehicle including the automatic clutch controller of the present invention. The motor vehicle includes engine 10 as a source of motive power. For a large truck of the type to which the present invention is most applicable, engine 10 would be a diesel internal combustion engine. An accelerator pedal 11 controls operation of engine 10 via throttle filter 12. Typically the torque control input to such an engine is a throttle for controlling air supply, although another control parameter such as fuel supply can be used instead. In any event, the throttle filter 12 is used to supply a torque control signal to the engine in response to the accelerator pedal 11. Throttle filter 12 is part of the clutch controller 60 and filters the throttle signal supplied to engine 10 by limiting the pedal 11 signal in some cases to a lower value. Engine 10 produces torque on engine shaft 15. Engine speed sensor 13 detects the rotational velocity of engine shaft 15. The actual site of rotational velocity detection by engine speed sensor may be at the engine flywheel. Engine speed sensor 13 is preferably a multitooth wheel whose tooth rotation is detected by a magnetic sensor.

Friction clutch 20 includes fixed plate 21 and movable plate 23 that are capable of full or partial engagement. Fixed plate 21 may be embodied by the engine flywheel. Friction clutch 20 couples torque from engine shaft 15 to transmission input shaft 25 corresponding to the degree of engagement between fixed plate 21 and movable plate 23. Note that while FIG. 1 illustrates only a single pair of fixed and movable plates, those skilled in the art would realize that clutch 20 could include multiple pairs of such plates.

A typical torque verses clutch position function is illustrated in FIG. 2. Clutch torque/position curve 80 is initially zero for a range of engagements before initial touch point 81. Clutch torque rises monotonically with increasing clutch engagement. In the example illustrated in FIG. 2, clutch torque rises slowly at first and then more steeply until the maximum clutch torque is reached upon full engagement at point 82. The typical clutch design calls for the maximum clutch torque upon full engagement to be about 1.5 times the maximum engine torque. This ensures that clutch 20 can transfer the maximum torque produced by engine 10 without slipping.

Clutch actuator 27 is coupled to movable plate 23 for control of clutch 20 from disengagement through partial engagement to full engagement. Clutch actuator 27 may be an electrical, hydraulic or pneumatic actuator and may be position or pressure controlled. Clutch actuator 27 controls the degree of clutch engagement according to a clutch engagement signal from clutch actuation controller 60. Clutch actuator 27 is a closed loop device that controls the degree of clutch engagement to cause the measured clutch position from clutch position sensor 28 to follow the clutch engagement signal. Touch point determination preferably employs the measured clutch position from clutch position sensor 28. Those skilled in the art would realize that clutch actuator 27 may be pressure controlled by a clutch actuation signal corresponding to the desired clutch pressure and employ clutch pressure feedback measured by a clutch pressure sensor.

Transmission input speed sensor 31 senses the rotational velocity of transmission input shaft 25, which is the input to transmission 30. Transmission 30 provides selectable drive ratios to drive shaft 35 under the control of transmission shift controller 33. Drive shaft 35 is coupled to differential 40. Transmission output speed sensor 37 senses the rotational velocity of drive shaft 35. Transmission input speed sensor 31 and transmission output speed sensor 37 are preferably constructed in the same manner as engine speed sensor 13. Where the motor vehicle is a large truck, differential 40 drives four axle shafts 41 to 44 that are in turn coupled to respective wheels 51 to 54.

Transmission shift controller 33 receives input signals from pedal 11, engine speed sensor 13, vehicle brake 14 pedal, transmission input speed sensor 31 and transmission output speed sensor 37. Transmission shift controller 33 generates gear select signals for control of transmission 30 and clutch engage/disengage signals coupled to clutch actuation controller 60. Transmission shift controller 33 preferably changes the final gear ratio provided by transmission 30 corresponding to the throttle setting, engine speed, transmission input speed and transmission output speed. Transmission shift controller 33 provides respective engage and disengage signals to clutch actuation controller 60 depending on whether friction clutch 20 should be engaged or disengaged. Transmission shift controller also transmits a gear signal to clutch actuation controller 60. This gear signal permits recall of the set of coefficients corresponding to the selected gear. Transmission shift controller 33 preferably briefly engages inertial brake 29 during upshifts. This slows the rotational speed of transmission input shaft 2 to match that of drive shaft 35 before engaging the higher gear. Touch point determination preferably employs inertial brake 29 in a manner that will be described below. The transmission shift controller 33 forms no part of the present invention and will not be further described.

Clutch actuation controller 60 provides a clutch engagement signal to clutch actuator 27 for controlling the position of movable plate 23. This controls the amount of torque transferred by clutch 20 according to clutch torque/position curve 80 of FIG. 2. Clutch actuation lo controller 60 operates under the control of transmission shift controller 33. Clutch actuation controller 60 controls the movement of moving plate 23 from disengagement to at least partial engagement or full engagement upon receipt of the engage signal from transmission shift controller 33. In the preferred embodiment it is contemplated that the clutch engagement signal will indicate a desired clutch position. Clutch actuator 27 preferably includes a closed loop control system employing the measured clutch position from clutch position sensor 28 for controlling movable plate 2 to this desired position. It is also feasible for the clutch engagement signal to represent a desired clutch pressure with clutch actuator 27 providing closed loop control to this desired pressure.

The control function of clutch actuation controller 60 is needed only for clutch positions between touch point 81 and full engagement. Clutch engagement less than that corresponding to touch point 81 provide no possibility of torque transfer because clutch 20 is fully disengaged. Upon receipt of the engage signal from transmission shift controller 33, clutch actuation controller 60 preferably rapidly advances clutch 20 to a point corresponding to touch point 81. This sets the zero of the clutch engagement control at touch point 81. Thereafter the clutch engagement is controlled by the control function of clutch actuation controller 60.

It is already known to determine the touch point of a clutch, either during operation or in advance. It is preferred to determine the touch point in advance by a test process which identifies the clutch position or a clutch pressure where the touch point occurs. The touch point process is fully disclosed in the U.S. patent application Ser. No. 07/815,501, filed Jan. 2, 1992, entitled "Touch Point Identification for Automatic Clutch Controller", which is assigned to the assignee of this invention and is incorporated herein by reference. This process is preferably a subset of the control function of clutch actuation controller 60.

Determination of the touch point involves putting transmission 3 in neutral and applying inertial brake 29. Inertial brake 29 is normally present to aid in matching the rotational speed of transmission input shaft 25 to that of drive shaft 35 during upshifts. Because clutch 20 is disengaged during the shift the amount of braking needed is very small. Inertial brake 29 need only develop a braking torque of about 5% of the idling engine torque. Clutch 20 is progressively engaged while engine 10 is idling until the transmission input speed reaches a predetermined fraction of the engine idle speed. This degree of clutch engagement, corresponding to point 83 of FIG. 2, transfers torque through clutch 20 to overcome the slight braking torque of inertial brake 29. A small, fixed offset 85 is subtracted from this degree of clutch engagement to determine the touch point 81.

FIG. 3 is a diagram showing the inputs and outputs of clutch mode control logic which is a subset of the clutch actuation controller 60. The logic establishes modes according to engine and transmission operating conditions and is used in the control of clutch actuation, and is also used in the operation of the throttle filter. The inputs to the logic are signals representing engine speed ($E_S$) from sensor 13, input speed ($I_S$) from sensor 31, accelerator pedal position from pedal 11, and a touch point signal produced when the clutch position reaches the predetermined touch position. The logic output is one of five modes set forth below.

Touch Point Approach Mode. Here the clutch is commanded to go to the touch point. When leaving the Auto Mode Off state due to a pedal signal exceeding a minimum threshold, this mode is in a waiting state in which the clutch is beginning to close, but the touch point has not yet been attained. If the clutch had already been engaged, the degree of engagement will be reduced to the touch point. No engine control signal will be allowed in this mode.

Creep Mode. This mode is established when the touch point is attained and the pedal signal is above the minimum level (3%) but below a threshold value, say 25%. During creep mode the clutch engagement is controlled to cause the input speed to smoothly approach a percentage of engine speed thereby causing the clutch to slip to allow slow vehicle maneuvers. As set forth in the prior patent applications, mentioned above, the input speed is controlled to a creep speed reference signal $R_{crp}=E_S(T/T_{ref})$, where $E_S$ is measured engine speed, $T$ is the throttle signal, and $T_{ref}$ is a reference constant equal to the throttle signal for 25% full throttle. The engine control signal (throttle signal) will be equal to the pedal signal in this mode.

Startup Mode. This mode is activated when the pedal signal reaches or exceeds the threshold value (25%) and is maintained so long as the pedal signal or engine speed remains high, but is terminated when clutch slip becomes small. In this mode, the principal management of the control signal occurs as described below. The clutch is controlled to engage at a rate dependent on the engine speed to smoothly advance the input speed to the engine speed. The term "Launch Mode" has sometimes been applied to this mode but here "Startup Mode" is preferred to distinguish from "Launch State", defined below.

Lockup Mode. This mode is normally entered from the startup mode when clutch slip becomes small. In this mode the clutch control signal fully engage the clutch. It is exited only when engine speed and pedal signal become low and/or when vehicle brakes are applied. This mode terminates the throttle filter function and the control signal will equal the pedal signal.

Auto Mode Off. One of the above four modes is active when the clutch controller is in an automatic mode. Auto Mode Off is active when there is no such automatic operation. Typically, the pedal signal will be at or near zero or the engine speed will be near idle. No control signal is output during this condition and the clutch is commanded to fully disengage.

Figure 4:
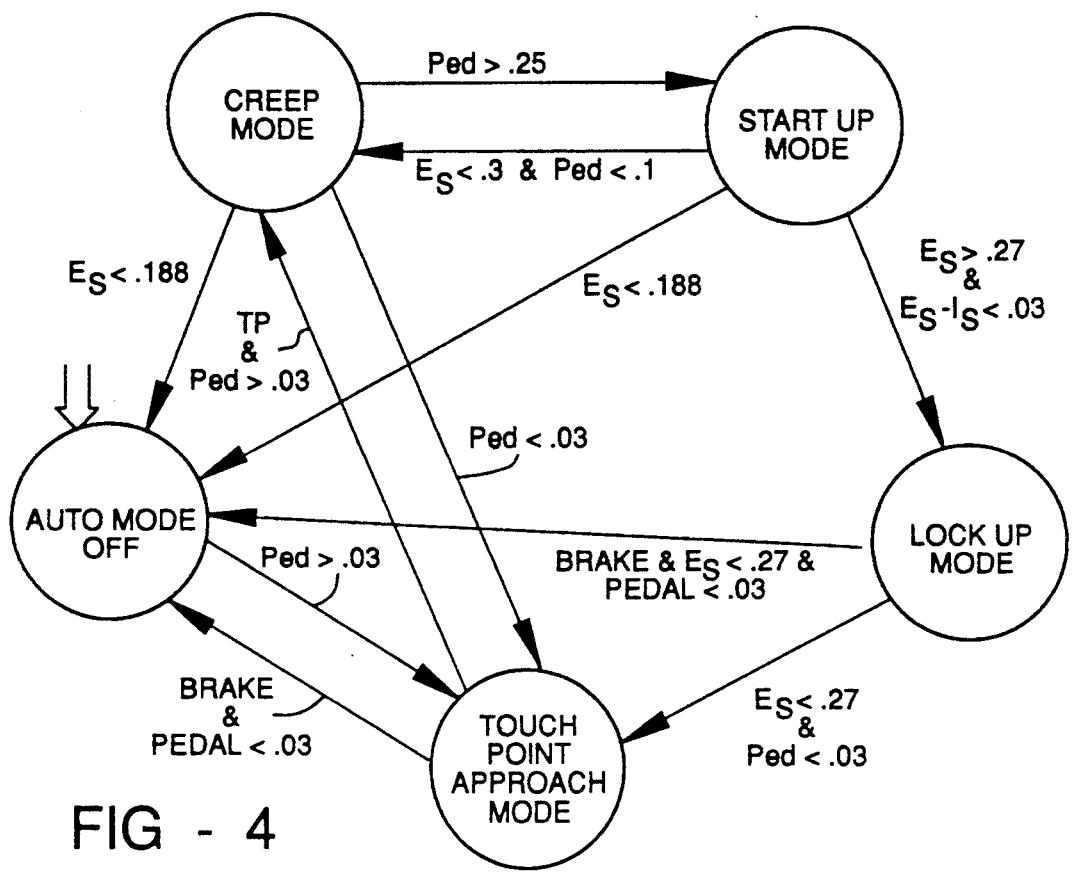
FIG. 4 is a bubble logic diagram for the clutch control logic of FIG. 3.

A bubble diagram in FIG. 4 illustrates the clutch mode control logic. Specific numbers are given in the diagram as an example applicable to a particular engine/transmission combination. Other numbers are appropriate in other applications. Each number refers to the decimal fraction of full scale or maximum value of the parameter indicated. For example, 0.25 or 25% of full pedal movement is selected as the ceiling of the Creep Mode and the beginning of the Startup Mode. Engine idle speed is 0.25; thus the value 0.27 is chosen to represent a certain speed above idle, and an engine speed less than 0.188 is approaching a stall condition. Also, to be sure that a low throttle signal is intentional, it is required that the system shall treat any pedal value less then 3% or 0.03 as a zero signal.

The diagram of FIG. 4 is entered in the Auto Mode Off condition. When the pedal signal exceeds 0.03, the Touch Point Approach Mode is activated. When at Touch Point Approach Mode, if the pedal signal drops below 0.03 and the brake is applied, the mode returns to Auto Mode Off. From Touch Point Approach no action occurs until the touch point TP occurs and the pedal signal is greater than 3%, and then Creep Mode is activated. If the engine speed approaches a stall condition the logic returns to Auto Mode Off, or if the pedal signal drops below 3% it returns to Touch Point Approach. Normally, the controller stays in the Creep Mode for small pedal signals, but if the pedal signal exceeds 25%, the Startup Mode is entered. If the engine speed becomes less than 0.3 and the pedal signal is less than 0.1, the Creep Mode is reentered. If the engine speed nears stall, the logic returns to Auto Mode Off. However, in the case of a successful clutch engagement, the clutch slip becomes small ($E_S - I_S < 0.03$) and if the engine speed remains above idle the Lockup Mode is entered. The controller will remain in Lockup Mode unless the pedal is released and the engine speed drops below its "above idle" point; then it will go to Touch Point Approach Mode. If the brake signal is present in addition to pedal release and engine speed drop below its "above idle" point, the controller will go to Auto Mode Off.

The block diagram for the throttle filter 12 or the throttle state logic is shown in FIG. 5. The inputs comprise four clutch control modes—Touch Point Approach, Startup, Creep, and Auto Mode Off as well as pedal position and engine acceleration. The outputs are four throttle logic states—Direct State, Touch Point State, Launch State, and Ramp State. The engine control signal function for each state is defined in the table below.

| FILTER STATE | CONTROL SIGNAL |
| --- | --- |
| Touch Point | Zero |
| Direct | Equal to Pedal |
| Launch | Ramp or Hold to % Pedal, then Hold at % Pedal |
| Ramp | Ramp to Pedal |

Figure 6:
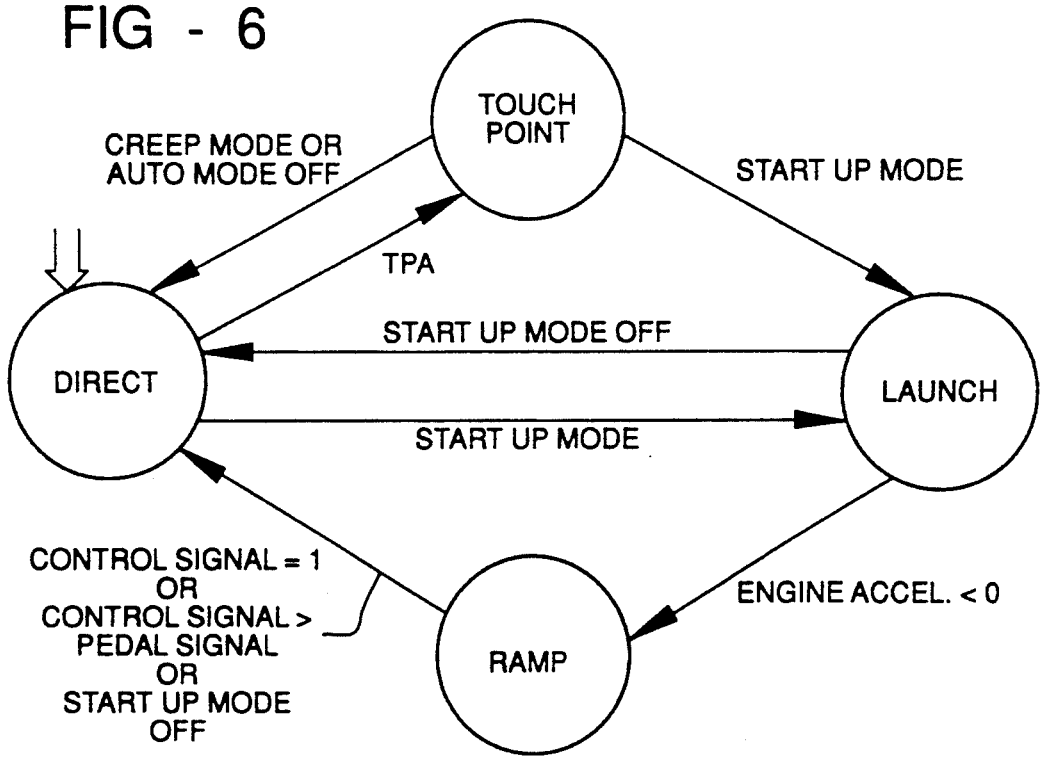
FIG. 6 is a bubble logic diagram for the throttle filter logic of FIG. 5.

The bubble logic diagram of FIG. 6 is entered in the Direct State. If the Touch Point Approach Mode is active, the Touch Point State is selected. In Touch Point State, either Creep Mode or Auto Mode Off will return the logic to Direct State. From either the Direct or the Touch Point State, if the Startup Mode is active, the Launch State is selected. In the Launch State, if the Startup Mode terminates the logic goes to the Direct State. Otherwise the Launch State is maintained until engine deceleration, which occurs when the clutch capacity has increased enough to handle the engine torque. Then the Ramp State is selected. The logic returns to the Direct State when the control signal reaches its maximum value or exceeds the pedal signal, or the Startup Mode turns off.

Figure 7:
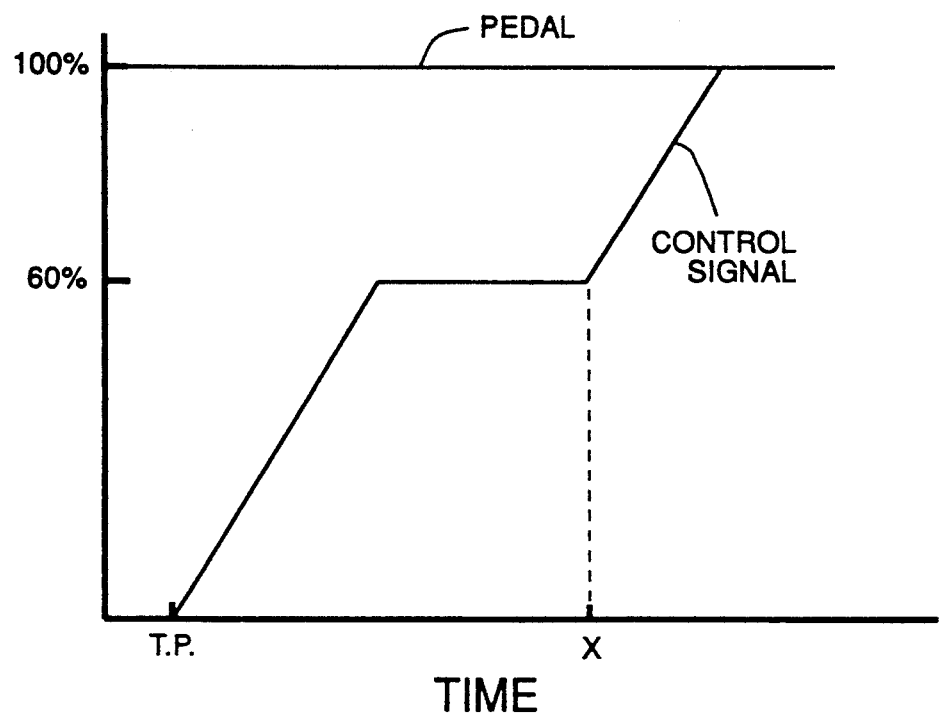
FIGS. 7 and 8 are diagrams showing the pedal position and engine control signals for a step pedal input and a ramp pedal input, respectively.
Figure 8:
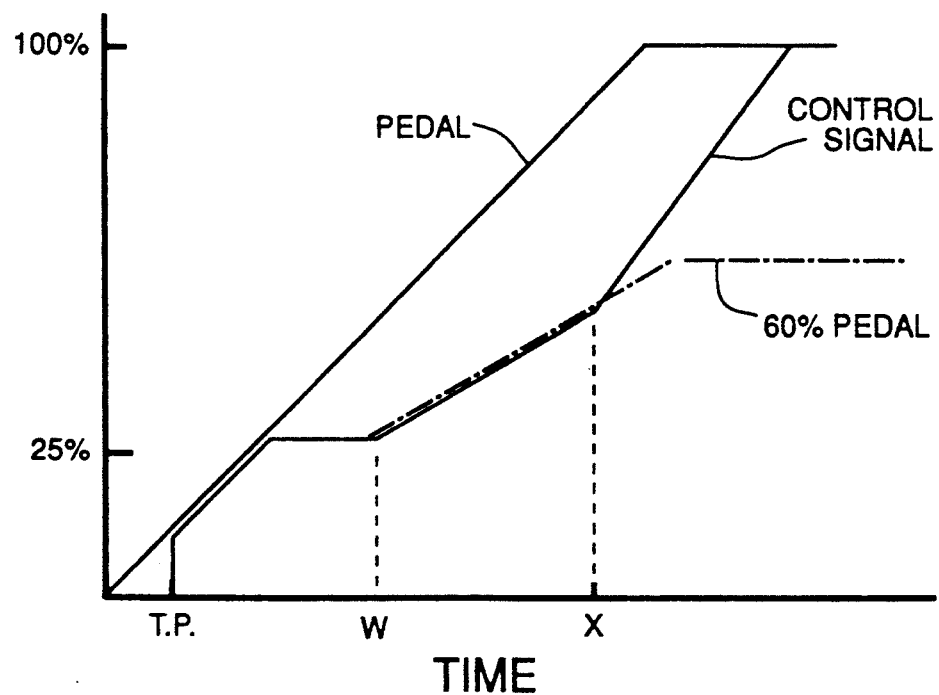

The operation of the throttle filter is illustrated in the graphs of FIGS. 7 and 8. FIG. 7 shows a condition of a step input to the accelerator pedal so that the pedal signal quickly goes to 100%. Since the pedal signal is greater than 3%, the clutch control logic goes to Touch Point Approach Mode and the throttle logic goes to the Touch Point State which allows no engine control signal. When the touch point TP occurs, the clutch control logic goes to the Creep Mode but immediately enters the Startup Mode because the pedal signal is greater than the 25% threshold and the Launch State is selected; that is, the clutch control mode logic process is completed before the throttle logic selects a state and therefor the Direct State is not invoked. The Launch state requires the control signal to ramp up at some specified rate until it reaches a given fraction, say 60%, of the pedal signal and then hold that fraction, say 60%, of the pedal signal and then hold that fraction. In this example the pedal is at 100% so the control signal ramps up to 60% and holds. If at time x the clutch capacity becomes sufficient to pull down the engine speed, the throttle logic activates the Ramp State which commands the control signal to gradually ramp up at a given rate to the pedal signal value. Eventually the clutch slip becomes very small and the clutch control changes from Startup Mode to Lockup Mode, completing the clutch closure. Since the Startup Mode is off, the throttle logic changes from Ramp State to Direct State, terminating the filter function.

In the FIG. 8 example, the accelerator pedal is gradually applied. At the touch point TP the pedal signal is less than 25% so that the Creep Mode and the Direct State are invoked, causing the control signal to follow the pedal signal until the pedal reaches 25% and the Startup Mode and Launch State are invoked. Because the control signal is already larger than 60% of the pedal signal, the control signal is held constant until the 60% condition is satisfied at time w. Then it follows the 60% line until time x when engine deceleration is detected and the Ramp State is entered to provide the final ramp of the control signal.

It will thus be seen that the control method establishes a control of the engine during clutch engagement in a way that prevents engine overspeeding and is also consistent with the clutch operation so that vehicle acceleration during the launch condition is smoothly carried out, and also allows full implementation of a creep mode at low pedal positions.

The embodiments of the invention in which an exclusive property or privilege is claimed are defined as follows:

1. In a vehicle having a gear transmission including an input-shaft driven through a friction clutch by an engine that is controlled by an accelerator pedal, and having a clutch actuation controller for actuating the friction clutch, wherein the friction clutch has engageable parts which initially touch and then progressively increase in torque transfer during actuation; a method of establishing a mode of clutch control during clutch engagement comprising the steps of:
   generating a pedal position signal;
   measuring engine speed and input shaft speed;
   detecting a touch point when the engageable parts of the clutch initially touch;
   detecting a minimum pedal position signal indicating that the pedal has been actuated;
   after touch point occurs and the minimum pedal signal is present, establishing a creep mode for pedal position below a first pedal threshold and a startup mode for pedal position above the threshold; and
   controlling clutch actuation in accordance with the established mode.

2. The invention as defined in claim 1 wherein;
   when in startup mode, the step of controlling clutch actuation comprises actuating the clutch to control the input shaft speed to the engine speed; and when in creep mode, the step of controlling clutch actuation comprises actuating the clutch to control the input shaft speed to a determinable fraction of the engine speed.

3. The invention as defined in claim 1 wherein when the control is in startup mode, returning the control the creep mode when the engine speed is below a speed threshold and the pedal position is below a second pedal threshold which is lower then the first pedal threshold, the speed threshold being above idle speed.

4. In a vehicle having a gear transmission including an input shaft driven through a friction clutch by an engine that is controlled by an accelerator pedal, and having a clutch actuation controller for actuating the friction clutch, wherein the friction clutch has engageable parts which initially touch and then progressively increase in torque transfer during actuation; a method of establishing a mode of clutch control during clutch engagement comprising the steps of:
generating a pedal position signal;
measuring engine speed and input shaft speed;
detecting a touch point when the engageable parts of the clutch initially touch;
detecting a minimum pedal position signal indicating that the pedal has been actuated;
after touch point occurs and the minimum pedal signal is present, establishing a creep mode for pedal position below a first pedal threshold and a startup mode for pedal position above the threshold;
controlling clutch actuation in accordance with the established mode;
when the control is in startup mode, entering a lockup mode when the engine speed is above idle speed and clutch slip is small; and
when in lockup mode, controlling the clutch actuation to fully engage the clutch.

5. The invention as defined in claim 1 including the steps of:
comparing input shaft speed and engine speed;
when the control is in startup mode, changing to lockup mode when the engine speed and the input shaft speed are nearly equal, and the engine speed is above idle speed; and
when in lockup mode, controlling the clutch actuation to fully engage the clutch.

6. The invention as defined in claim 5 including the steps of:
changing from the lockup mode to the touch point approach mode when the engine speed becomes less than a set value above idle speed and the pedal position is less than the minimum.

7. In a vehicle having a gear transmission including an input shaft driven through a friction clutch by an engine that is controlled by an accelerator pedal, and having a clutch actuation controller for actuating the friction clutch, wherein the friction clutch has engageable parts which initially touch and then progressively increase in torque transfer during actuation; a method of establishing a mode of clutch control during clutch engagement comprising the steps of:
generating a pedal position signal;
measuring engine speed and input shaft speed;
detecting a touch point when the engageable parts of the clutch initially touch;
detecting a minimum pedal position signal indicating that the pedal has been actuated;
after touch point occurs and the minimum pedal signal is present, establishing a creep mode for pedal position below a first pedal threshold and a startup mode for pedal position above the threshold;
controlling clutch actuation in accordance with the established mode;
comparing input shaft speed and engine shaft;
when the control is in startup mode, charging to lockup mode when the engine speed and the input shaft speed are nearly equal, and the engine speed is above idle speed;
when in lockup mode, controlling the clutch actuation to fully engage the clutch;
generating a brake signal when vehicle brakes are applied; and
changing from the lockup mode to the auto mode off state to effect clutch disengagement when the engine speed becomes less than a set value above idle speed, the pedal position is less than the minimum, and the brake signal is present.

8. In a vehicle having a gear transmission including an input shaft driven through a friction clutch by an engine that is controlled by an accelerator pedal, and having a clutch actuation controller for actuating the friction clutch, wherein the friction clutch has engageable parts which initially touch and then progressively increase in torque transfer during actuation, the clutch actuation controller having automatic modes including touch point approach mode, creep mode, startup mode and lockup mode, and an auto mode off state; a method of establishing the mode of clutch control during clutch engagement comprising the steps of:
generating a pedal position signal;
measuring engine speed;
measuring input shaft speed;
initiating operation in the auto mode off state wherein the clutch is fully disengaged;
changing from the auto mode off state to the touch point approach mode when the pedal position is above a minimum;
when in touch point approach mode, controlling the clutch to the touch point;
determining a touch point when the engageable parts of the clutch initially touch; and
after touch point occurs and the minimum pedal signal is present, establishing a creep mode for pedal position below a first pedal threshold and a startup mode for pedal position above the threshold.

9. The invention as defined in claim 8 including the step of changing from either the creep mode or the startup mode to the auto mode off state when the engine speed is less than a value indicative of an approaching stall condition, thereby controlling the clutch to full disengagement.

10. The invention as defined in claim 8 including the step of changing from the startup mode to lockup mode when a difference between the engine speed and the input shaft speed is below a slip threshold indicative of low clutch slip, and the engine speed is above idle speed; and
when in lockup mode, controlling the clutch actuation to fully engage the clutch.

* * * * *